US008660783B2

(12) United States Patent
Marczi et al.

(10) Patent No.: US 8,660,783 B2
(45) Date of Patent: Feb. 25, 2014

(54) SYSTEMS AND METHODS FOR DETECTING OWNSHIP DEVIATION FROM ASSIGNED TAXIWAY CLEARANCE

(75) Inventors: Tomas Marczi, Beroun (CZ); Tomas Kabrt, Prague (CZ); Kevin J. Conner, Kent, WA (US); John Howard Glover, Redmond, WA (US); Jan Bilek, Cerveny Kostelec (CZ)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/347,954

(22) Filed: Jan. 11, 2012

(65) Prior Publication Data

US 2013/0179060 A1 Jul. 11, 2013

(51) Int. Cl.
*G06G 7/76* (2006.01)
*G05D 1/00* (2006.01)

(52) U.S. Cl.
USPC .................. 701/120; 701/3; 701/23; 701/117

(58) Field of Classification Search
USPC ........... 701/3, 17, 23, 117, 120; 340/436, 961
See application file for complete search history.

(56) References Cited

U.S. PATENT DOCUMENTS

| | | | | |
|---|---|---|---|---|
| 6,314,363 | B1 * | 11/2001 | Pilley et al. | 701/120 |
| 7,499,794 | B1 * | 3/2009 | Bailey et al. | 701/120 |
| 7,630,829 | B2 * | 12/2009 | Pepitone | 701/120 |
| 8,271,184 | B2 * | 9/2012 | Gayraud et al. | 701/120 |
| 2004/0225440 | A1 | 11/2004 | Khatwa et al. | |
| 2005/0190079 | A1 | 9/2005 | He | |
| 2009/0115637 | A1 | 5/2009 | Naimer et al. | |
| 2009/0150068 | A1 * | 6/2009 | Villaume et al. | 701/206 |
| 2009/0265089 | A1 * | 10/2009 | Gauffriau et al. | 701/120 |
| 2010/0017127 | A1 * | 1/2010 | Pepitone et al. | 701/301 |

OTHER PUBLICATIONS

EP Search Report for Application No. EP 13 150 433.4 dated Jun. 5, 2013.

* cited by examiner

*Primary Examiner* — Mary Cheung
*Assistant Examiner* — Rodney Butler
(74) *Attorney, Agent, or Firm* — Ingrassia Fisher & Lorenz, P.C.

(57) ABSTRACT

Systems and methods for identifying ownship deviation from assigned taxi-clearance in the area of taxiway intersection. An exemplary system provides alerts in the event of a significant deviation from the assigned clearance, but does not give unwanted alerts when the flight crew is performing normal turning maneuvers in the area of an intersection.

4 Claims, 12 Drawing Sheets

SYSTEMS AND METHODS FOR DETECTING OWNSHIP DEVIATION FROM ASSIGNED TAXIWAY CLEARANCE

BACKGROUND OF THE INVENTION

One of the projects of the Single European Sky Air Traffic Management Research is to improve the crew awareness when the ownship (which may be an aircraft or a ground vehicle) deviates from a taxi-clearance assigned by air traffic control (ATC).

Any system providing a solution will have a problem addressing when a vehicle deviates from the taxi clearance in an intersection area. Especially in the case of a small angle between intersecting taxiways (causing a big turn), the real trajectory and maintained turn radius of ownship fully depend on the flight crew and are "unpredictable" for any system onboard the ownship. Monitoring change of ownship heading and position during the turn is not feasible, due to the fact that the ownship can start the turn by turning to the opposite direction, see FIG. 1-1. How much ownship turns and goes to the opposite direction before it starts turning on the assigned taxiway fully depends on the technique used by the flight crew.

FIG. 1-2 is an aerial photograph of an airport taxiway intersection showing various tire marks in several locations, and presents evidence that different airplanes make the same turn with different radii (trajectory). The challenge is to provide an alert, if the crew makes a significant deviation from the assigned clearance, while permitting normal maneuvering without providing unwanted alerts.

SUMMARY OF THE INVENTION

The invention solves the problem of identification of ownship deviation from assigned taxi-clearance in the area of taxiway intersection. The presented solution provides alerts in the event of a significant deviation from the assigned clearance, but does not give unwanted alerts when the flight crew is performing normal turning maneuvers in the area of an intersection.

BRIEF DESCRIPTION OF THE DRAWINGS

Preferred and alternative embodiments of the present invention are described in detail below with reference to the following drawings:

FIG. 2 is a block diagram of an exemplary system formed in accordance with an embodiment of the present invention;

DETAILED DESCRIPTION OF THE INVENTION

Figure 1:
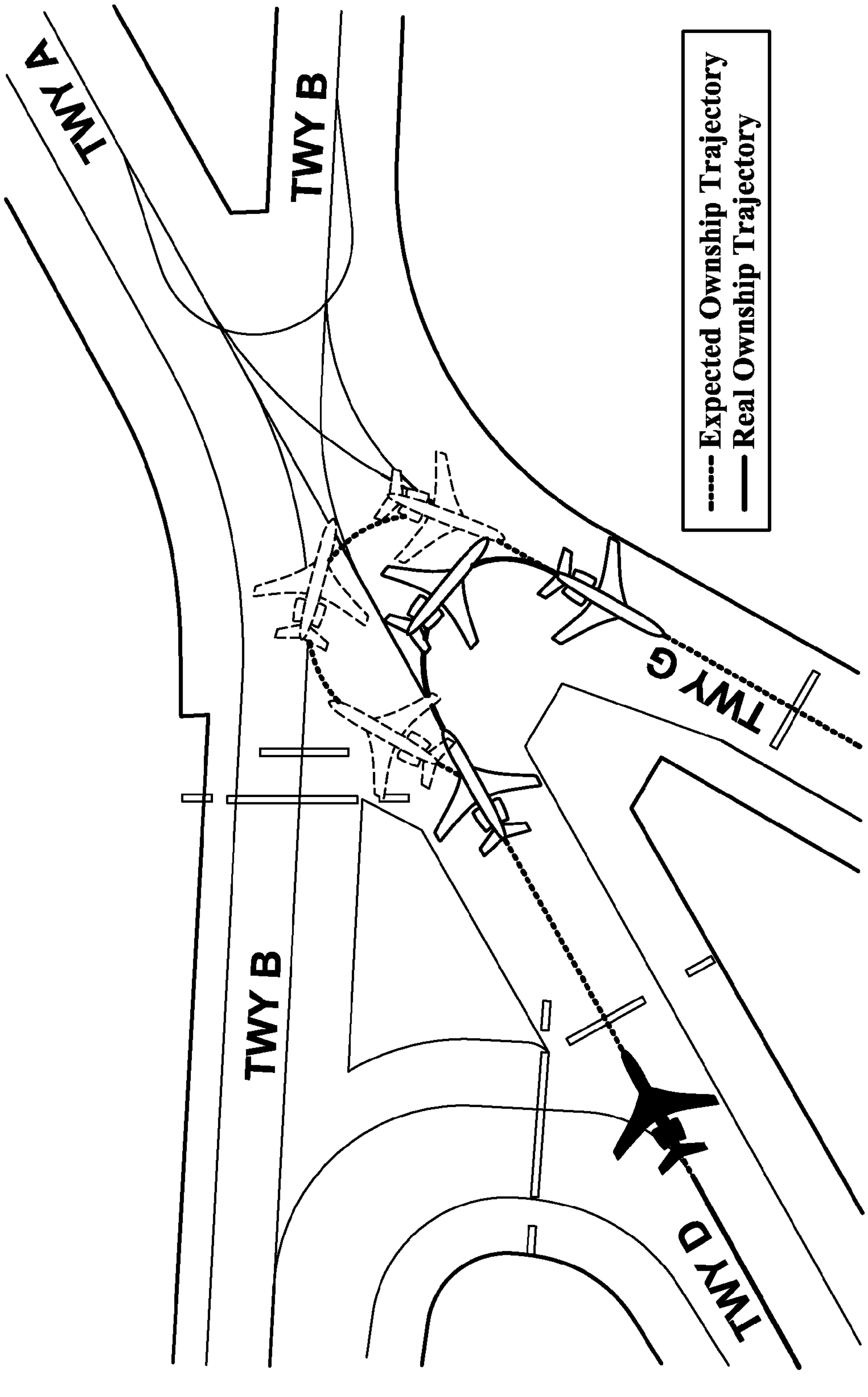
FIG.1-1 (prior art)
FIGS. 1-1 and 1-2 are overhead views of taxiway intersections that experience various radius turns by aircraft making transitions from one taxiway to the other taxiway.
Figures 1, 2:
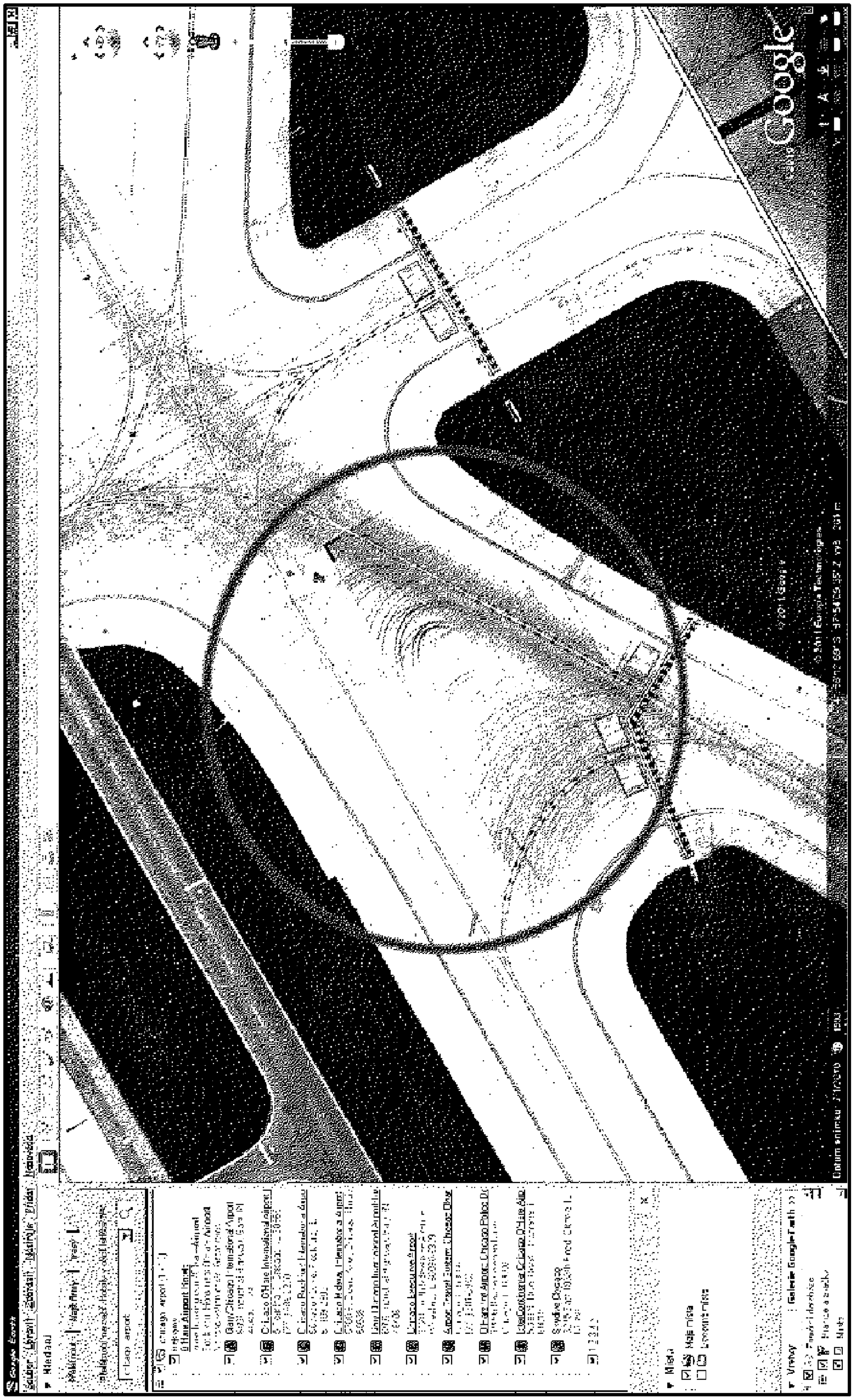
FIG.1-2 (prior art)
Figure 2:
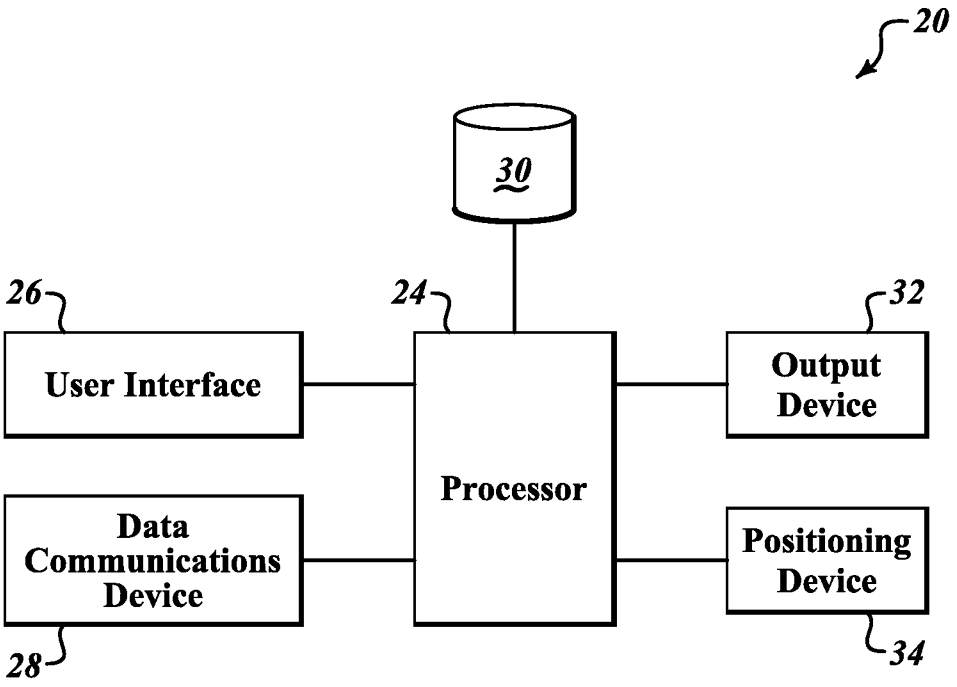

FIG. 2 shows a system 20 located on a vehicle (i.e., ownship), such as an aircraft or airport ground vehicle, for alerting if the crew of the vehicle makes a significant deviation from an assigned taxiway clearance, while permitting normal maneuvering without providing unwanted alerts. The system 20 includes a processor 24 that is in signal communication with a user interface device 26, a data communication device 28, a database 30, an output device 32, and a positioning system 34. The processor 24 receives vehicle position information from the positioning system 34, airport taxiway and vehicle information from the database(s) 30, and taxiway clearance information from the user interface device 26 or from a remote source via the data communication device 28. Based on the received data, the processor 24 determines if the vehicle has deviated from the taxiway clearance, except within a control area or inhibit zone associated with taxiway intersections.

An inhibit area (zone) is defined by the taxiway on which the ownship is currently taxiing as it approaches a taxiway intersection and by the taxiway on which ownship is cleared to exit the taxiway intersection. The processor 24 calculates the angle between the assigned taxiways and the size of the inhibit zone according to magnitude of the angle, the width of the taxiways (not in all embodiments), and the known dimensions of ownship. The inhibit zone is defined to be compatible with commonly used taxiway centerline radius dimensions as defined in Federal Aviation Administration (FAA) Advisory Circular AC 150/5300-13. The inhibit zone is a circle or a polygon, but other shapes are possible.

Once the ownship enters the inhibit zone, the processor 24 inhibits taxiway clearance alerting until the ownship exits the zone. If the ownship is not on the assigned taxiway and aligned with the assigned taxiway, the alert is triggered when the ownship is not within any inhibit zone. If the ownship is within the bounds of the correct taxiway, no alert is given.

In one embodiment, the alerts provided by the processor 24 include graphically highlighted areas of a cockpit map display (the output device 32), text messages on the display, or aural messages provided to the crew via cockpit loudspeaker or headset (the output device 32).

Figure 3:
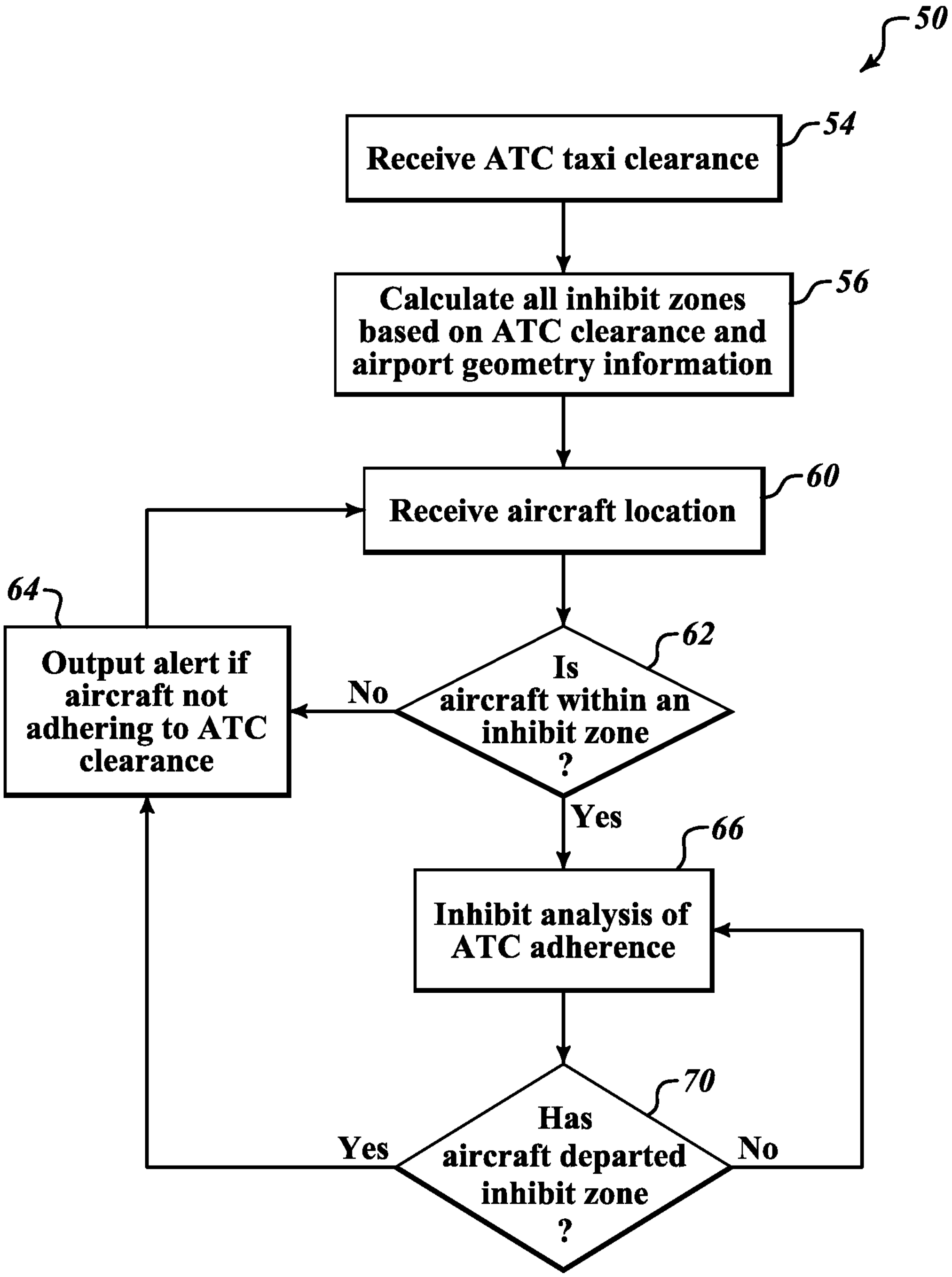
FIGS. 3, 4, 7, and 10 are flowcharts of exemplary processes performed by the system shown in FIG. 2.

FIG. 3 illustrates an exemplary process 50 performed by the system 20 shown in FIG. 2 for detecting ownship deviation from an assigned taxiway clearance, except for within a defined inhibit zone located at taxiway intersections within the taxiway clearance. First, at a block 54, taxiway clearance is received from a ground taxi authority, e.g., ATC. Next at a block 56, the processor 24 calculates all inhibit zones based on the taxiway clearance and airport geometry information retrieved from the database 30. In one embodiment, inhibit zone information is precalculated by the ownship or a control authority for all taxiway intersections and directions of travel. The precalculated inhibit zone information is stored in in short-time memory of the processor 24 or the database 30. If the inhibit zone information is generated by the control authority, the ownship receives it from the control authority via the data communication device 28 (e.g., Controller Pilot Data Link Communications (CPDLC)). In this embodiment, the processor retrieves the precalculated inhibit zone information associated with the taxiway clearance.

Then, at a block 60, the processor 24 receives aircraft location information from the positioning system 34. Then, at a decision block 62, the processor 24 determines if the aircraft is within a calculated inhibit zone. If the aircraft is determined to not be within one of the calculated inhibit zones, then, at a block 64, the processor 24 outputs an alert to the output device 32, if the aircraft is not currently adhering to the taxiway clearance. If the aircraft was determined to be within an inhibit zone, then, at a block 66, the analysis of whether the aircraft is adhering to the taxiway clearance is inhibited. Then, at a decision block 70, processor 24 determines if the aircraft has departed the inhibit zone. Once the aircraft has departed the inhibit zone, then the process 50 proceeds to the block 64.

Figure 4:
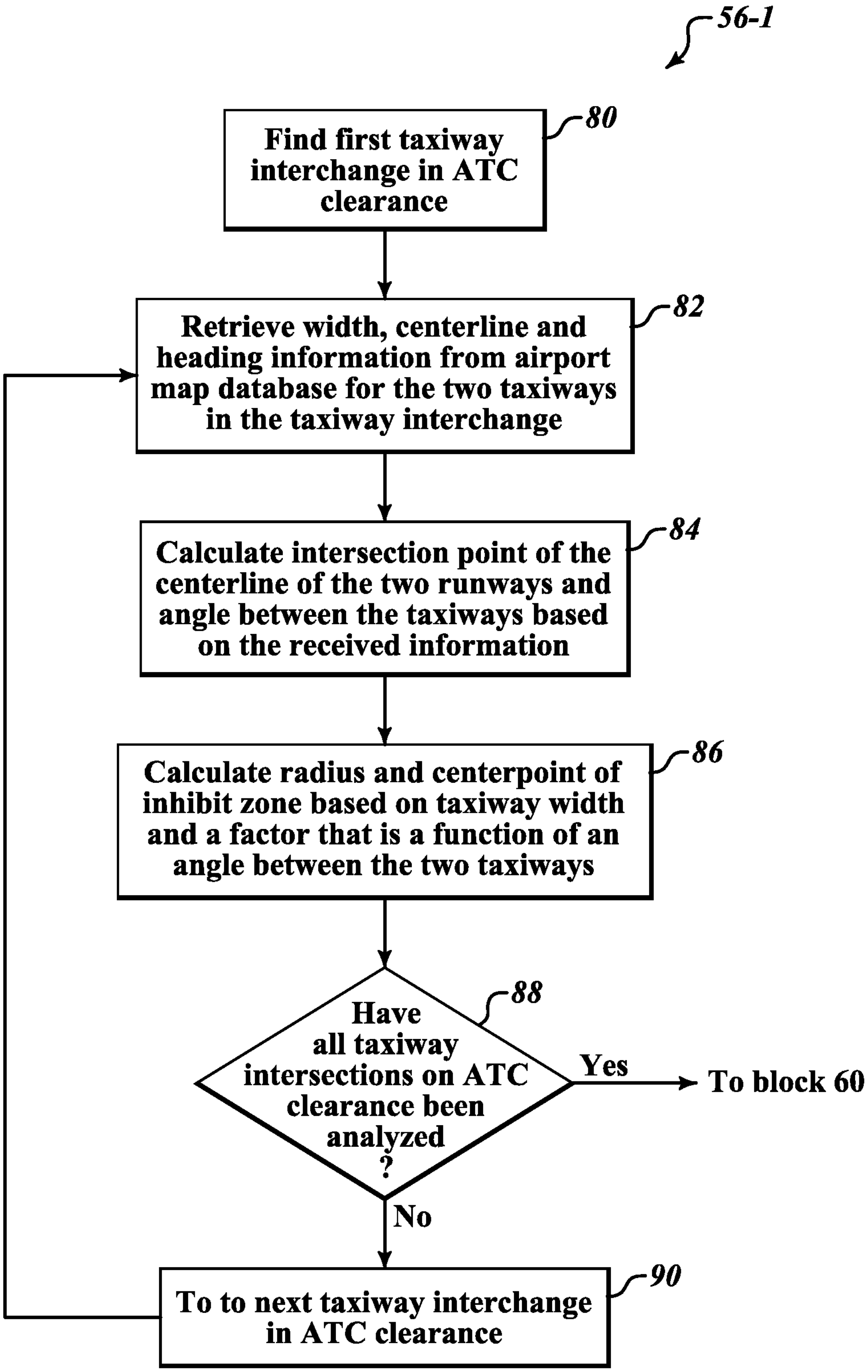

FIG. 4 illustrates an exemplary process 56-1 for performing the calculation of inhibit zones performed at block 56 in FIG. 3. First, at block 80, a first taxiway interchange in the taxiway clearance is found. Next, at a block 82, width, centerline location, and heading information are retrieved from the runway database 30 for the two taxiways associated with the found taxiway interchange. At a block 84, the intersection point of the centerlines of the two taxiways and the angle between the two taxiways are calculated based on the retrieved information. Next at a block 86, the centerpoint and the radius of the inhibit zone are calculated, based on the taxiway width and a factor that is a function of the angle between the two taxiways. Next, at a decision block 88, the process 56-1 determines if all of the taxiway intersections on the taxiway clearance have been analyzed. If not all of the taxiway interchanges have been analyzed, then at a block 90, the process 56-1 repeats for the next taxiway intersection in the taxiway clearance. Otherwise, the process 56-1 returns and proceeds to block 60, as shown in FIG. 3.

Figure 5:
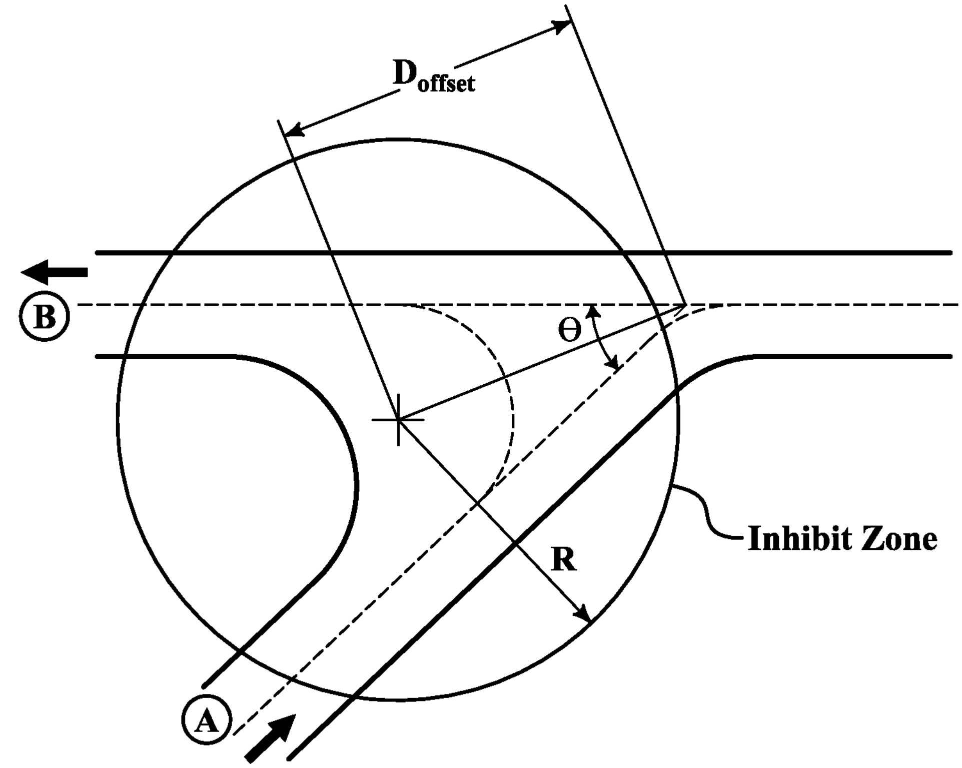
FIGS. 5, 6, 8, 9, 11, and 12 illustrate geographical representations of one of the processes shown in FIG. 3, 4, 7, or 10.

FIG. 5 illustrates an inhibit zone 92 generated for two taxiways that form an acute angle on a taxiway clearance. The inhibit zone 92 is that generated from the process shown in FIG. 4.

Figure 6:
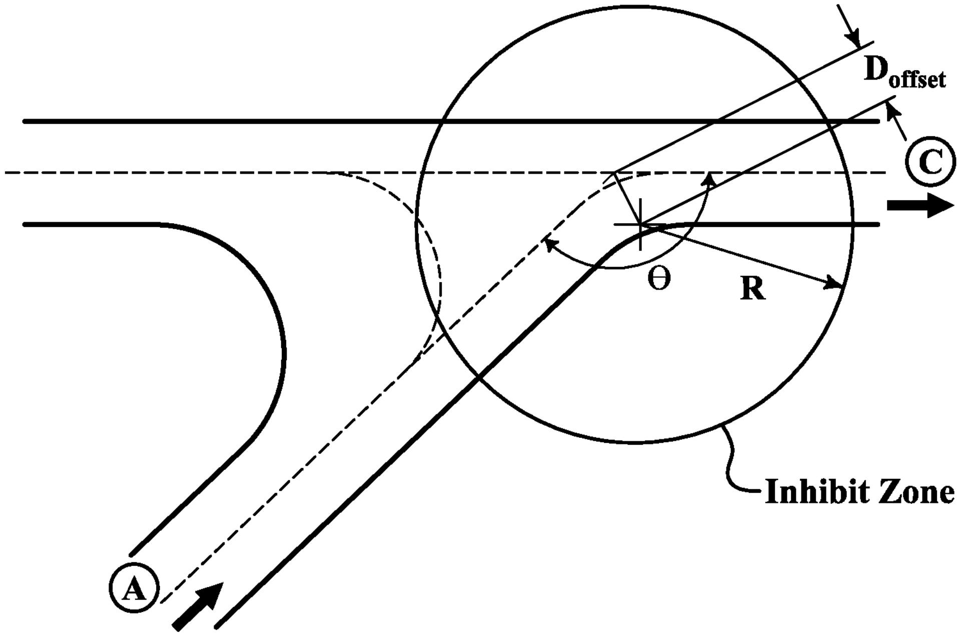

FIG. 6 illustrates an inhibit zone 94 between two taxiways that form an obtuse angle between the two. The inhibit zones 92 and 94 are defined by the radius and the centerpoint of the inhibit zone. The centerpoint of the inhibit zone is defined by an offset value d that is defined based on the radius and a factor that is a function of the included angle between the taxiways.

The calculations required to obtain radius R and offset distance $D_{Offset}$ for the circular inhibit zones 92, 94 shown in FIGS. 5 and 6 are as follows. First, the included angle θ between the taxiway centerlines is calculated. Then the radius of the circle is calculated from eq. 1.

$$R=2\cdot TWY_{Width}\cdot K_R \quad (1)$$

where factor $K_R$ is a function of the included angle θ.

Offset distance $D_{offset}$ is given by eq. 2.

$$D_{Offset}=\frac{R\cdot K_C^2}{2} \quad (2)$$

where factor $K_c$ is a function of the included angle θ.

Figure 7:
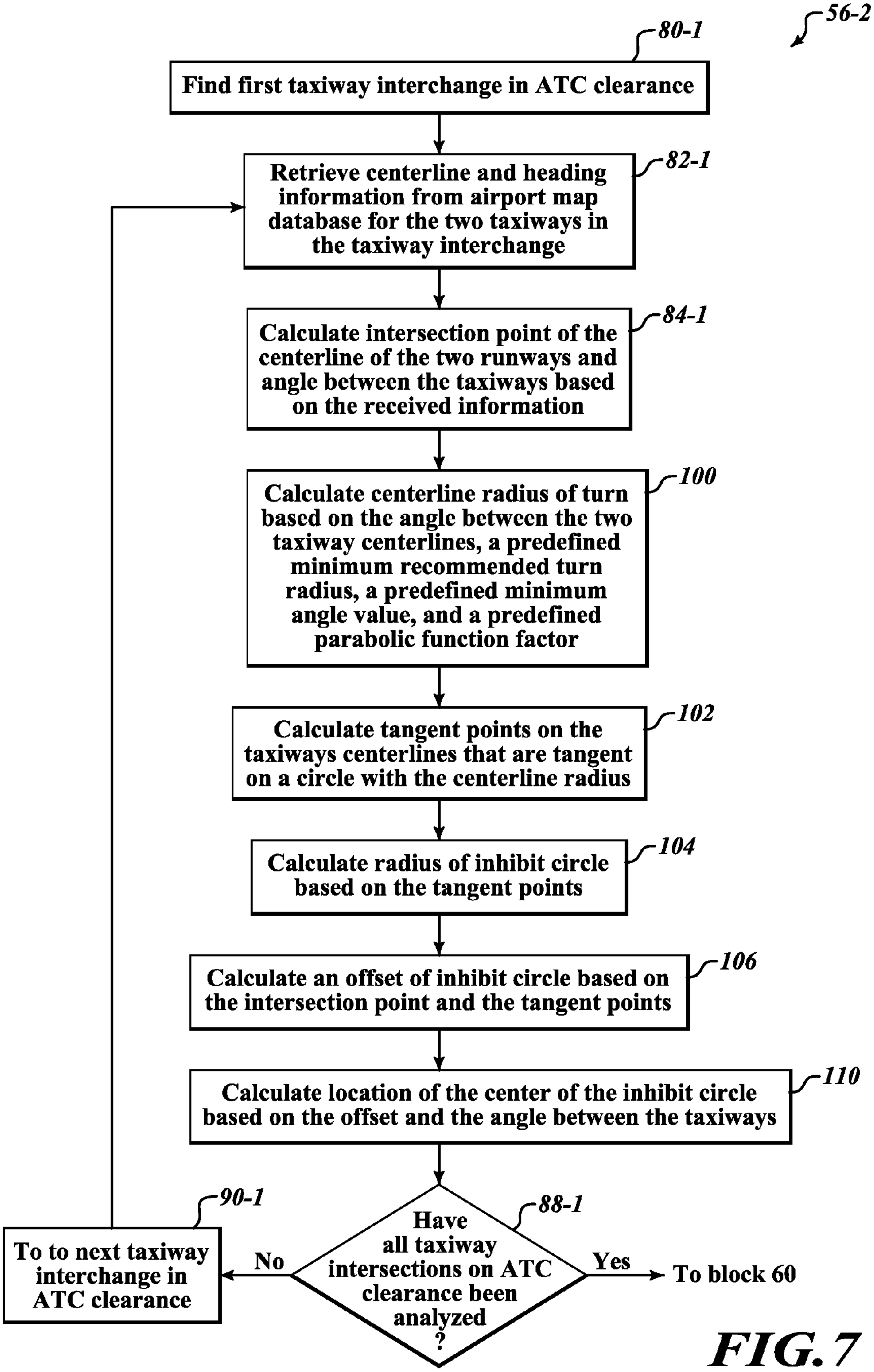

FIG. 7 illustrates another exemplary process 56-2 for calculating the inhibit zones, as shown in block 56 of FIG. 3. The first three steps 80-1, 82-1, and 84-1 are similar to steps 80-84 shown in FIG. 4 except width is not used. Then, at a block 100, centerline radius of turn is calculated based on the included angle θ between the two taxiway centerlines, a predefined minimum recommended turn radius, a predefined minimum angle value, and a predefined parabolic function factor. Next, at a block 102, lines that are tangent to a circle having the calculated centerline radius of turn and that correlate to the centerlines for the two runways are determined. The tangent points of those determined lines is determined.

Next, at a block 104, the radius of an inhibit zone (circle) is calculated based on the tangent points. Next, at a block 106, an offset of the inhibit circle is calculated based on the intersection point and the tangent points. At a block 110, location of the center of the inhibit circle is calculated based on the offset and the angle between the taxiways. Blocks 88-1 and 90-1 are similar to blocks 88 and 90 from FIG. 4 and provide the function of repeating for all of the taxiway interchanges within the current analyzed taxiway clearance.

Figure 8:
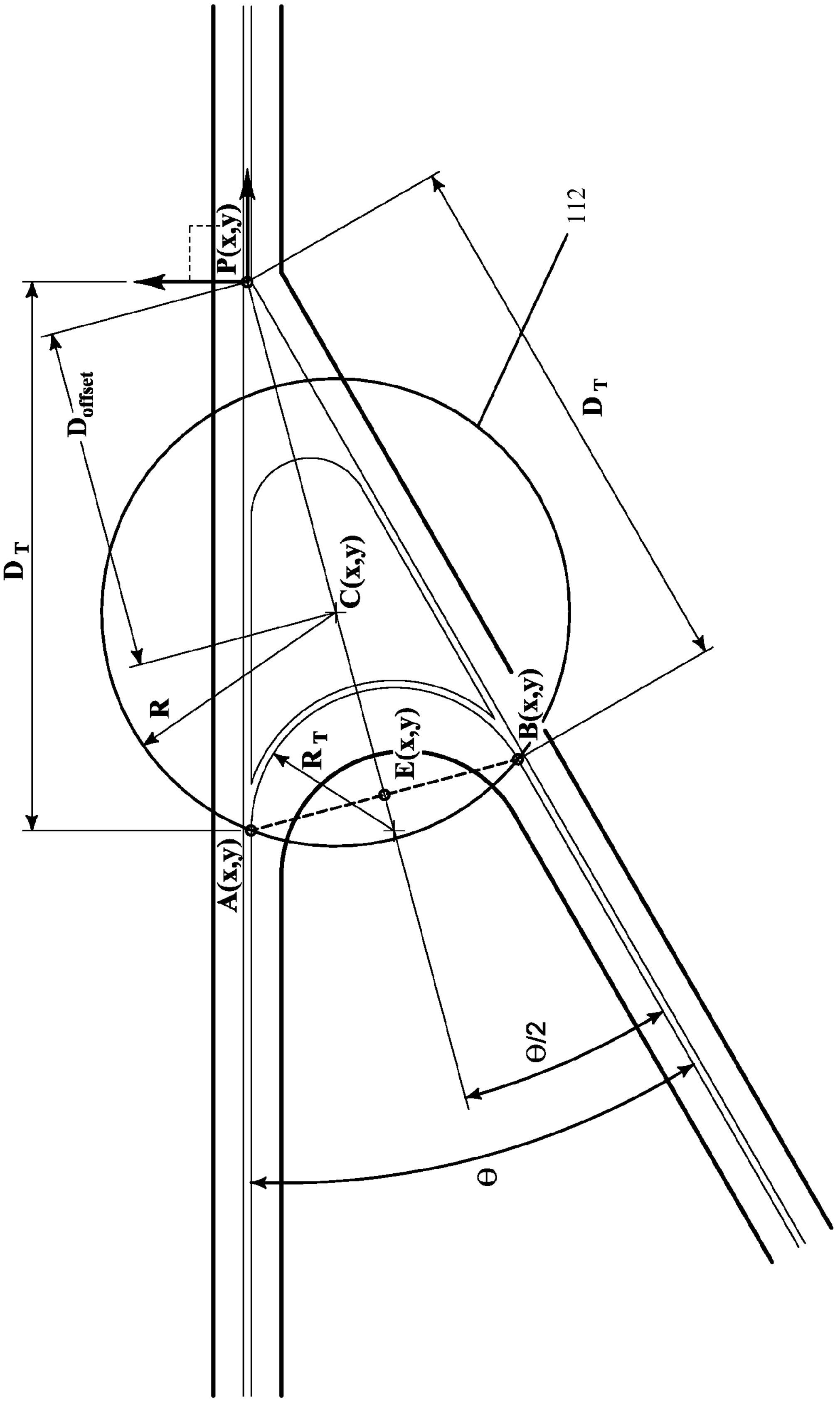
Figure 9:
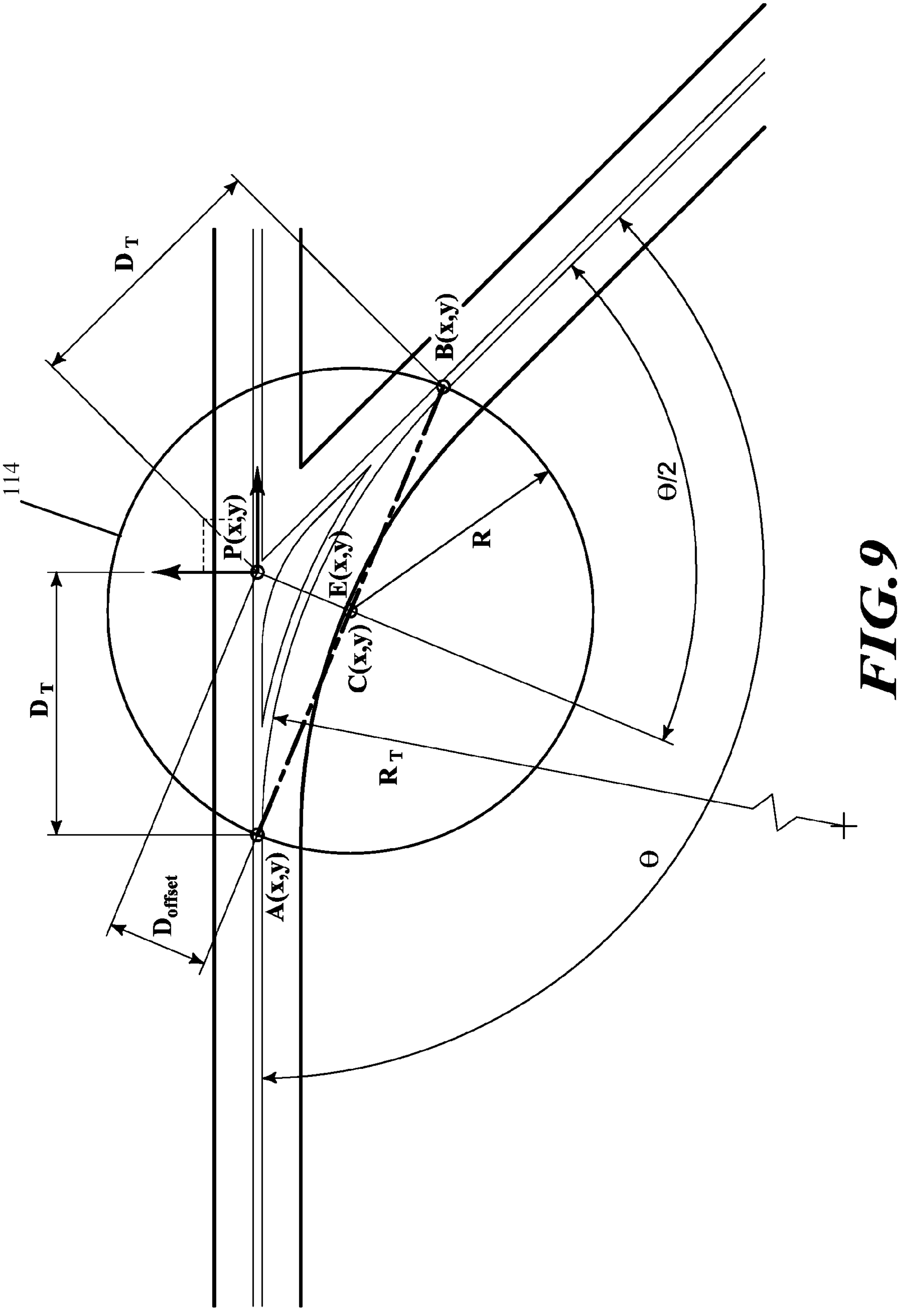

FIGS. 8 and 9 illustrate inhibit zones 112, 114 for taxiways that have an included angle θ that is acute and an included angle θ that is obtuse, respectively.

The following are exemplary algorithms used by the processor 56-2 shown in FIG. 7. The centerline radius of turn is calculated as a function of the included angle θ.

$$R_T=R_0+\frac{(\Theta-\Theta_0)^2}{2\cdot p} \quad (3)$$

where $p=const.$ $\Theta_0=const.$ $R_0=const.$

FAA AC 150/5300-13 defines recommendations for airport design. Based on this FAA document and review of some international airports' layouts, the values of minimum angle and centerline radius between two intersecting taxiways has been defined. These defined values are used as a constants in the presented calculation ($R_0$—Minimum centerline radius; $\theta_0$—Minimum angle between two taxiways).

The centerline radius changes with the change of angle between two taxiways. In one embodiment, the change of centerline radius is approximated by a parabolic function (see equation 3; parameter [p] is parabolic function factor used for approximation of centerline radius change).

The tangent points A[X,Y] and B[X,Y] of radius $R_T$ and both taxiways are calculated.

$$D_T=\frac{R_T}{tg\left(\frac{\Theta}{2}\right)}\Rightarrow A[X,Y];\ B[X,Y] \quad (4)$$

For the included angle θ between the taxiway centerlines greater than 90° the circle area can be located in the point of intersection of included angle centerline and connection line of tangent points A[X,Y] and B[X,Y].

$$X_E=X_{Center\_90\to180}=X_A+\frac{X_B-X_A}{2} \quad (5)$$

$$Y_E=Y_{Center\_90\to180}=Y_B+\frac{Y_A-Y_B}{2}$$

$$R=\sqrt{(X_A-X_{Center\_90\to180})^2+(Y_A-Y_{Center\_90\to180})^2}$$

For the included angle θ between the taxiway centerlines smaller than 90° definition of circle area center is based on the dimension $D_{Offset}$ definition.

$$D_{Offset}=K_D\cdot\frac{\sqrt{(X_E-X_P)^2+(Y_E-Y_P)^2}}{2} \quad (6)$$

where $K_D$=const.

Position of center of circle area is given by eqs. 7.

$$X_{Center\_0\to90}=X_P-D_{Offset}\cdot\cos\left(\frac{\Theta}{2}\right) \quad (7)$$

-continued $$Y_{Center\_0\to90} = Y_P - D_{Offset} \cdot \sin\left(\frac{\Theta}{2}\right)$$

Radius of circle area is defined by the following.

$$R = K_R \cdot \sqrt{(X_A - X_{Center\_0\to90})^2 + (Y_A - Y_{Center\_0\to90})^2} \tag{8}$$

where factor $K_R$ is a function of the included angle.

Figure 10:
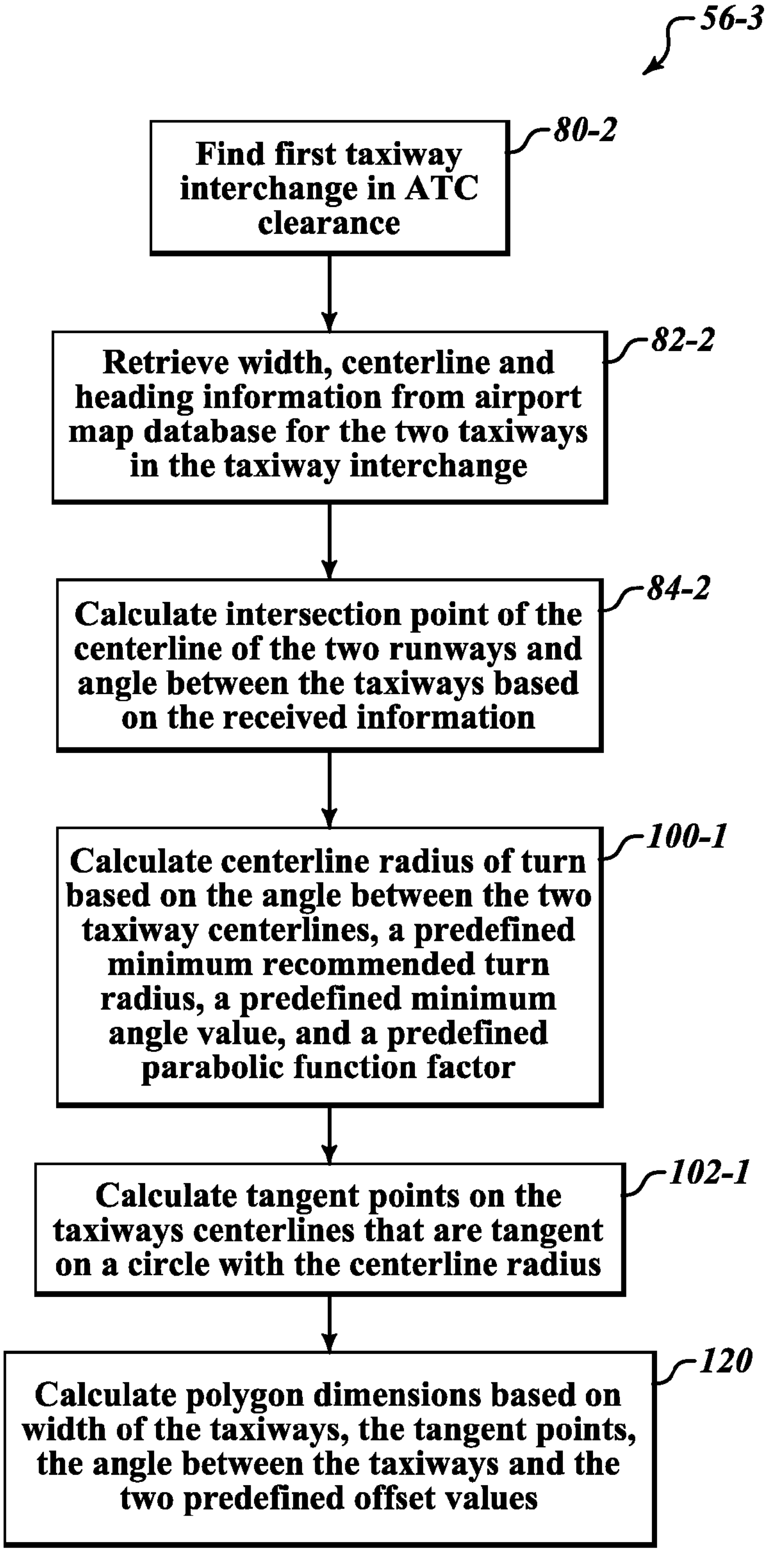

FIG. 10 illustrates an exemplary process 56-3 for generating inhibit zones that are polygons, from block 56 of FIG. 3. The first three steps, blocks 80-2, 82-2, and 84-2 of the process 56-3, are similar to steps 80-84, as shown in FIG. 4. The next two steps (blocks 100-1, 102-1) are identical to those at blocks 100 and 102 of FIG. 7. Next, at a block 120, dimensions of the polygon are calculated based on width of the taxiways, the tangent points, the angle between the taxiways, and the two calculated offset values. The process 56-3 repeats in a similar manner to that of FIGS. 4 and 7 (blocks 88, 88-1, 90, 90-1) until all of the taxiway interchanges have been analyzed.

Figure 11:
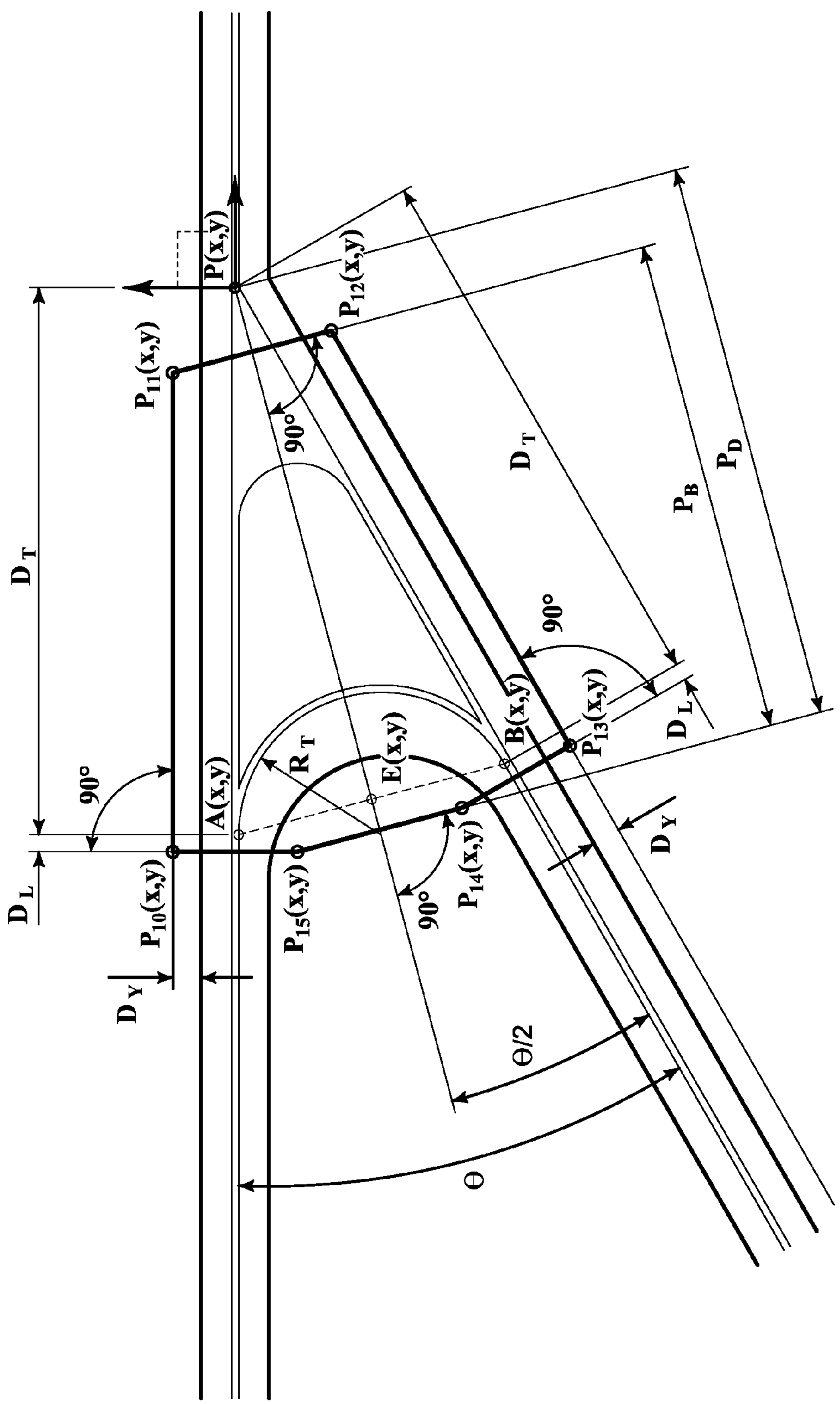

FIG. 11 illustrates a polygon inhibit zone 140 formed in accordance with the process 56-3 shown in FIG. 10.

Taxiway centerline turn radius $R_T$, tangent points A[X,Y] and B[X,Y], and dimension $D_T$ defined above are used.

In one embodiment, dimensions $P_D$ and $P_B$ are calculated as follows:

$$P_D = (D_T + D_L)\cdot\cos\left(\frac{\Theta}{2}\right) + \left(D_Y + \frac{TWY_{Width}}{2}\right)\cdot\sin\left(\frac{\Theta}{2}\right) \tag{9}$$

$$P_B = P_D - \left(D_Y + \frac{TWY_{Width}}{2}\right)\cdot\frac{\cos(2\Theta)}{\sin\Theta}$$

where dimensions $D_L$ and $D_Y$ are a constant.

Figures 1, 12:
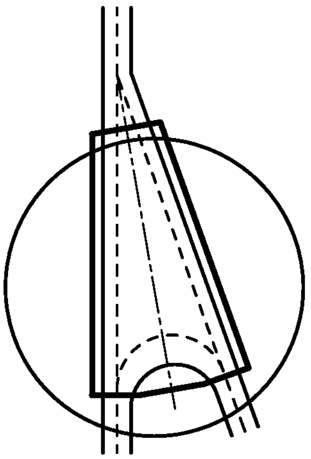
Figures 2, 12:
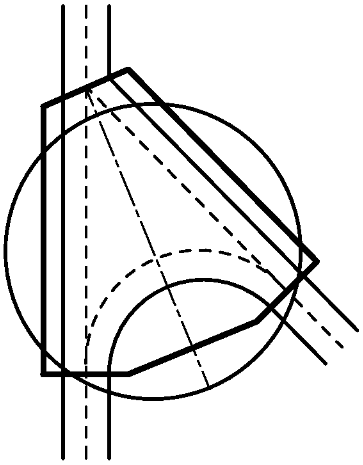
Figures 3, 12:
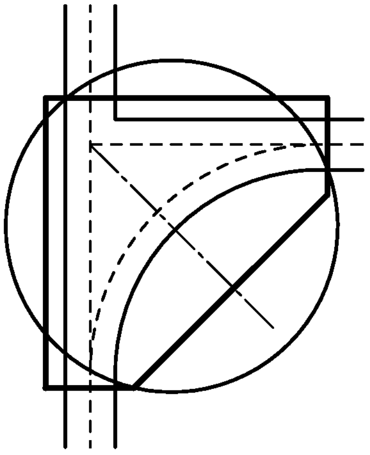
Figures 4, 12:
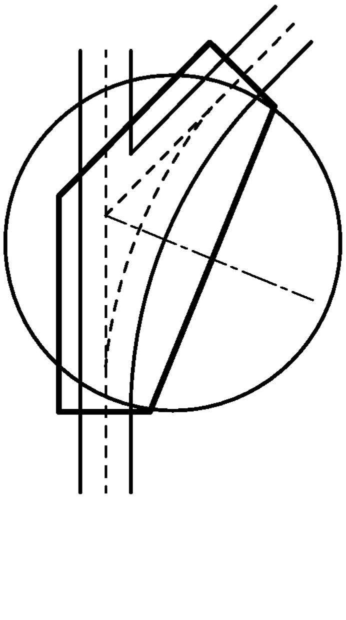
Figures 5, 12:
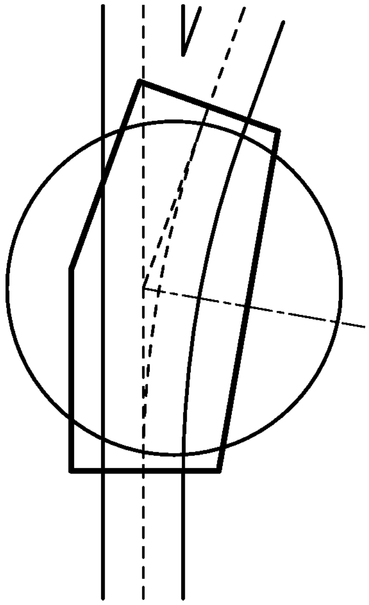

FIGS. 12-1 through 12-5 illustrate various other taxiway interchanges and resulting circular and polygonal inhibit zones.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method performed by a processing device located on a vehicle, the method comprising:

receiving a taxiway clearance;

retrieving taxiway intersection inhibit zones based on the taxiway clearance;

receiving vehicle position and heading information; and generating a nonadherence-to-taxiway clearance alert based on the at least one position and heading information, if the vehicle is determined to not be located within one of the inhibit zones;

wherein retrieving taxiway intersection inhibit zones comprises:

retrieving taxiway centerline, and heading information for two taxiways identified in the taxiway clearance as being intersecting;

calculating an intersection point of the centerlines of the two taxiways based on the retrieved information;

a) calculating an angle between the centerlines;

b) calculating a centerline radius of turn based on the calculated angle and the predefined recommended turn radius;

c) calculating points on the centerlines in which the centerlines are tangent to a circle having the calculated centerline radius of turn;

d) if the calculated angle is at least less than or equal to 90 degrees, calculating offset coordinates for a center of the inhibit zone based on the tangent points and the intersection point, and calculating a radius for the inhibit zone based on calculated offset coordinates and one of the tangent points;

e) if the calculated angle is greater than 90 degrees, calculating center coordinates for the inhibit zone as being a point located at an intersection between a line connecting the tangent points and a line having equal angular values to the centerlines, calculating radius for the inhibit zone based on the calculated center coordinates and one of the tangent points; and f) repeating a) through e) for all intersecting taxiways in the taxiway clearance.

2. The method of claim 1, wherein retrieving further comprises:

c) calculating polygonal dimensions for the inhibit zone based on the taxiway width, the tangent points, the calculated angle and two predefined offset values for all intersecting taxiways in the taxiway clearance.

3. A system located on a vehicle, the system comprising:

a communication device configured to receive a taxiway clearance;

a memory device configured to store taxiway intersection inhibit zones based on the taxiway clearance;

a positioning device configured to generate vehicle position and heading information;

an output device; and a data processing device configured to:

retrieve for each of two taxiways identified in the taxiway clearance as being intersecting at least two of taxiway width, centerline, and heading information;

calculate an intersection point of the centerlines of the two taxiways based on the retrieved information;

calculate an angle between the centerlines;

calculate an inhibit zone for the two intersecting taxiways based on the calculated angle between the two intersecting taxiways and the intersection point and based on at least one of the taxiway width information and predefined recommended turn radius;

determine if the vehicle is located within one of the inhibit zones based on the generated at least one position and heading information; and generate a nonadherence-to-taxiway clearance alert, if the vehicle is determined to not be located within one of the inhibit zones, wherein any generated nonadherence-to-taxiway clearance alert is not outputted via the output device when the vehicle is determined to be located within one of the inhibit zones;

wherein the memory device is further configured to store centerline, and heading information for two taxiways identified in the taxiway clearance as being intersecting, wherein the data processing device is further configured to calculate the inhibit zone by:

a) calculating a centerline radius of turn based on the calculated angle and the predefined recommended turn radius;

b) calculating points on the centerlines in which the centerlines are tangent to a circle having the calculated centerline radius of turn;

c) if the calculated angle is at least less than or equal to 90 degrees, calculating offset coordinates for a center of the inhibit zone based on the tangent points and the intersection point, and calculating radius for the inhibit zone based on calculated offset coordinates and one of the tangent points d) if the calculated angle is greater than 90 degrees, calculating center coordinates for the inhibit zone as being a point located at an intersection between a line connecting the tangent points and a line having equal angular values to the centerlines, and calculating radius for the inhibit zone based on the calculated center coordinates and one of the tangent points; and repeat a) through d) for all intersecting taxiways in the taxiway clearance.

4. The system of claim 3, wherein the data processing device is further configured to calculate the inhibit zone by:

calculating polygonal dimensions for the inhibit zone based on the taxiway width, the tangent points, the calculated angle and two predefined offset values for all intersecting taxiways in the taxiway clearance.

* * * * *